United States Patent
Lan et al.

(10) Patent No.: US 10,164,701 B2
(45) Date of Patent: Dec. 25, 2018

(54) ANTENNA ALLOCATION METHOD AND TERMINAL

(71) Applicant: Huawei Technologies Co., Ltd., Shenzhen (CN)

(72) Inventors: Yuan-Hao Lan, Shanghai (CN); Chien-Jen Huang, Shanghai (CN); Hsingyu Lung, Shanghai (CN); Haw-Wei Shu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/559,927

(22) PCT Filed: Apr. 10, 2015

(86) PCT No.: PCT/CN2015/076349
§ 371 (c)(1),
(2) Date: Sep. 20, 2017

(87) PCT Pub. No.: WO2016/161645
PCT Pub. Date: Oct. 13, 2016

(65) Prior Publication Data
US 2018/0083690 A1   Mar. 22, 2018

(51) Int. Cl.
| | |
|---|---|
| H04B 7/00 | (2006.01) |
| H04B 7/08 | (2006.01) |
| H04W 88/06 | (2009.01) |
| H04W 4/021 | (2018.01) |

(52) U.S. Cl.
CPC ............. *H04B 7/0814* (2013.01); *H04B 7/08* (2013.01); *H04W 4/021* (2013.01); *H04W 88/06* (2013.01)

(58) Field of Classification Search
CPC ..... H04B 7/0814; H04W 4/021; H04W 88/06
USPC ....................................................... 455/277.2
See application file for complete search history.

(56) References Cited

U.S. PATENT DOCUMENTS

| | | | |
|---|---|---|---|
| 9,622,291 B2* | 4/2017 | Kim | ................... H04W 88/06 |
| 2006/0073829 A1 | 4/2006 | Cho et al. | |
| 2012/0282982 A1 | 11/2012 | Mujtaba et al. | |
| 2013/0064151 A1 | 3/2013 | Mujtaba et al. | |
| 2014/0024323 A1 | 1/2014 | Clevom et al. | |
| 2015/0065073 A1 | 3/2015 | Yan et al. | |

FOREIGN PATENT DOCUMENTS

| | | |
|---|---|---|
| CN | 201629739 U | 11/2010 |
| CN | 103503333 A | 1/2014 |
| CN | 103582047 A | 2/2014 |

(Continued)

OTHER PUBLICATIONS

Machine Translation and Abstract of Chinese Publication No. CN201629739, Nov. 10, 2010, 6 pages.

(Continued)

*Primary Examiner* — Sanh D Phu
(74) *Attorney, Agent, or Firm* — Conley Rose, P.C.

(57) ABSTRACT

An antenna allocation method and a terminal for modems to receive a signal with a good antenna includes allocating a first antenna to a first modem; and if it is determined that the first modem satisfies a preset state, allocating the first antenna to any one of N-1 modems other than the first modem.

13 Claims, 3 Drawing Sheets

(56) References Cited

FOREIGN PATENT DOCUMENTS

GB         2507800 A     5/2014

OTHER PUBLICATIONS

Foreign Communication From a Counterpart Application, PCT Application No. PCT/CN2015/076349, English Translation of International Search Report dated Sep. 28, 2015, 2 pages.
Foreign Communication From a Counterpart Application, PCT Application No. PCT/CN2015/076349, English Translation of Written Opinion dated Sep. 28, 2015, 7 pages.
Foreign Communication From a Counterpart Application, European Application No. 15888201.9, Extended European Search Report dated Jan. 25, 2018, 7 pages.

* cited by examiner

ANTENNA ALLOCATION METHOD AND TERMINAL

CROSS-REFERENCE TO RELATED APPLICATIONS

This application is a national stage application of International Patent Application No. PCT/CN2015/076349, filed on Apr. 10, 2015, which is herein incorporated by reference in its entirety.

TECHNICAL FIELD

The disclosure relates to the communications field, and in particular, to an antenna allocation method and a terminal.

BACKGROUND

Currently, a user using Global System for Mobile Communications (GSM) can obtain a network service only after inserting a subscriber identity module (SIM) card into a mobile phone. With development of the industry of mobile communications, mobile communications products have become necessities in people's life. It gradually becomes a common phenomenon that a user possesses two or more modems. Emergence of dual-SIM dual-standby mobile phones meets user's requirements, and a user can freely switch modems for communication according to requirements.

Two modems of a dual-SIM dual-standby mobile phone have respective paging cycles, and each modem receives, within a paging cycle of the modem, a signal sent by a base station to maintain a network connection. Usually, the mobile phone has two antennas for receiving signals. Performance of one antenna is good (the antenna can successfully receive a signal), and performance of the other antenna is poor (the antenna can hardly demodulate a signal). The prior art only enables each modem to use a fixed antenna but cannot ensure that each modem receives a signal by using a good antenna. For example, a good antenna is allocated to a primary modem, and a poor antenna is allocated to a secondary modem. In this way, the primary modem receives a signal by using a good antenna within a paging cycle of the primary modem, and performs normal communication. However, the secondary modem cannot receive a signal (or receives a very weak signal) by using a poor antenna within a paging cycle of the secondary modem, and consequently, the secondary modem is disconnected from a network.

SUMMARY

Embodiments of the disclosure provide an antenna allocation method and a terminal, so as to enable modems to receive a signal by using a good antenna in turn.

To achieve the foregoing objective, the following technical solutions are used in the embodiments of the disclosure.

According to a first aspect, an antenna allocation method is disclosed, applied to a terminal provided with N subscriber identity modems, N being an integer greater than 1, and including allocating a first antenna to a first modem; and if it is determined that the first antenna is a good antenna, allocating the first antenna to any one of N-1 modems other than the first modem when it is determined that the first modem satisfies a preset state.

With reference to the first aspect, in a first possible implementation of the first aspect, determining that the first modem satisfies a preset state specifically includes determining that the first modem already continuously receives Y paging signals, where Y is a preset value; or determining that signal quality values of Y paging signals continuously received by the first modem are all greater than a preset threshold.

With reference to the first aspect, in a second possible implementation of the first aspect, determining that the first modem satisfies a preset state specifically includes determining that a paging cycle of the first modem already ends.

With reference to the first aspect or the first or second possible implementation of the first aspect, in a third possible implementation of the first aspect, if it is determined that the first antenna is a poor antenna, a second antenna is allocated to the first modem.

With reference to the third possible implementation of the first aspect, in a fourth possible implementation of the first aspect, determining that the second antenna is a poor antenna specifically includes receiving a paging signal corresponding to the first modem by using the first antenna, and determining that a signal quality value of a paging signal that is received by using the second antenna is less than the preset threshold; or skipping receiving a signal corresponding to the first modem by using the first antenna.

With reference to any one of the first aspect, or the first to the fourth possible implementations of the first aspect, a fifth possible implementation of the first aspect, determining that the first antenna is a good antenna specifically includes receiving the paging signal corresponding to the first modem by using the first antenna; and determining that the signal quality value of the paging signal that is received by using the first antenna is greater than the preset threshold; or determining that the signal corresponding to the first modem is received by using the first antenna.

According to a second aspect, a terminal is disclosed, where the terminal is provided with N subscriber identity modems, N being an integer greater than 1, and includes an allocation unit configured to allocate a first antenna to a first modem; and a determining unit configured to determine whether an antenna is a good antenna or a poor antenna, where the allocation unit is further configured to, if the determining unit determines that the first antenna is a good antenna, allocate the first antenna to any one of N-1 modems other than the first modem when the determining unit determines that the first modem satisfies a preset state.

With reference to the second aspect, in a first possible implementation of the second aspect, the determining unit is specifically configured to determine that the first modem satisfies the preset state when it is determined that the first modem already continuously receives Y paging signals, where Y is a preset value; or determine that the first modem satisfies the preset state when it is determined that signal quality values of Y paging signals continuously received by the first modem are all greater than a preset threshold.

With reference to the second aspect, in a second possible implementation of the second aspect, the determining unit is specifically configured to determine that the first modem satisfies the preset state when it is determined that a paging cycle of the first modem already ends.

With reference to the second aspect or the first or second possible implementation of the second aspect, in a third possible implementation of the second aspect, the allocation unit is further configured to allocate a second antenna to the first modem if the determining unit determines that the first antenna is a poor antenna.

With reference to the third possible implementation of the second aspect, in a fourth possible implementation of the second aspect, the terminal further includes a receiving unit, where the receiving unit is configured to receive a paging signal corresponding to the first modem by using the first antenna; and the determining unit is specifically configured to determine that the second antenna is a poor antenna when it is determined that a signal quality value of a paging signal that is received by using the second antenna is less than the preset threshold, or determine that the first antenna is a poor antenna when it is determined that a signal corresponding to the first modem is not received by using the first antenna.

With reference to any one of the second aspect, or the first to the fourth possible implementations of the second aspect, in a fifth possible implementation of the second aspect, the determining unit is specifically configured to determine that the first antenna is a good antenna when it is determined that the paging signal corresponding to the first modem is received by using the first antenna; and determine that the first antenna is a good antenna when it is determined that the signal quality value of the paging signal that is received by using the first antenna is greater than the preset threshold.

According to a third aspect, a terminal is disclosed, where the terminal is provided with N subscriber identity modems, N being an integer greater than 1, and includes a processor configured to allocate a first antenna to a first modem, where the processor is further configured to determine whether an antenna is a good antenna or a poor antenna; and the processor is further configured to, if it is determined that the first antenna is a good antenna, allocate the first antenna to any one of N−1 modems other than the first modem when it is determined that the first modem satisfies a preset state.

With reference to the third aspect, in a first possible implementation of the third aspect, the processor is specifically configured to determine that the first modem satisfies the preset state when it is determined that the first modem already continuously receives Y paging signals, where Y is a preset value; or determine that the first modem satisfies the preset state when it is determined that signal quality values of Y paging signals continuously received by the first modem are all greater than a preset threshold.

With reference to the third aspect, in a second possible implementation of the third aspect, the processor is specifically configured to determine that the first modem satisfies the preset state when it is determined that a paging cycle of the first modem already ends.

With reference to the third aspect or the first or second possible implementation of the third aspect, in a third possible implementation of the third aspect, the processor is further configured to allocate a second antenna to the first modem if it is determined that the first antenna is a poor antenna.

With reference to the third possible implementation of the third aspect, in a fourth possible implementation of the third aspect, the processor is further configured to receive a paging signal corresponding to the first modem by using the first antenna; and the processor is specifically configured to determine that the second antenna is a poor antenna when it is determined that a signal quality value of a paging signal that is received by using the second antenna is less than the preset threshold, or determine that the first antenna is a poor antenna when it is determined that a signal corresponding to the first modem is not received by using the first antenna.

With reference to any one of the third aspect, or the first to the fourth possible implementations of the third aspect, in a fifth possible implementation of the third aspect, the processor is specifically configured to determine that the first antenna is a good antenna when it is determined that the paging signal corresponding to the first modem is received by using the first antenna; and determine that the first antenna is a good antenna when it is determined that the signal quality value of the paging signal that is received by using the first antenna is greater than the preset threshold.

The disclosure provides an antenna allocation method and a terminal. A first antenna is allocated to a first modem. If it is determined that the first modem satisfies a preset state, the first antenna is allocated to any one of N−1 modems other than the first modem. After the first antenna is allocated to any modem other than the first modem, after the any modem satisfies the preset state, the first antenna may be allocated to any one of remaining modems. In this way, it can be ensured that modems receive a signal by using a good antenna in turn. Compared with the prior art in which some modems are disconnected from a network because it cannot be ensured that each modem receives a signal by using a good antenna, the method and the terminal that are provided in the disclosure may avoid a problem that a modem is disconnected from a network because the modem cannot use a good antenna.

BRIEF DESCRIPTION OF DRAWINGS

To describe the technical solutions in the embodiments of the disclosure more clearly, the following briefly describes the accompanying drawings required for describing the embodiments. The accompanying drawings in the following description show merely some embodiments of the disclosure, and a person of ordinary skill in the art may still derive other drawings from these accompanying drawings without creative efforts.

DESCRIPTION OF EMBODIMENTS

The following clearly and completely describes the technical solutions in the embodiments of the disclosure with reference to the accompanying drawings in the embodiments of the disclosure. The described embodiments are merely some but not all of the embodiments of the disclosure. All other embodiments obtained by a person of ordinary skill in the art based on the embodiments of the disclosure without creative efforts shall fall within the protection scope of the disclosure.

Usually, a terminal in a standby state maintains a network connection by receiving, within a paging cycle, a paging message sent by a base station. The paging message is transmitted by the base station to a mobile phone at a fixed time on a fixed channel. Specifically, the terminal maintains a network connection by receiving, by a modem, the paging message sent by the base station. Each modem receives, within a paging cycle of the modem, paging messages continuously sent by the base station. Contention exists between modems, where paging cycles of the modems may overlap (that is, paging cycles collide), or only by using a particular antenna, each modem can receive a paging message sent by the base station. If two modems have a same definition of a good antenna and a poor antenna, the two modems may consider a same antenna as a good antenna, and then the two modems contend for use of the antenna.

Contention does not exist between modems, where modems do not need to contend for use of a particular antenna, or paging cycles of modems do not overlap (that is, paging cycles do not collide).

When the paging cycles of the modems do not overlap, because a good antenna is usually fixedly allocated to a particular modem, remaining modems cannot receive a paging signal or receive a paging signal with an excessively low signal quality value within paging cycles of the modems because the modems cannot use the good antenna, and consequently, these modems are disconnected from a network. For example, a mobile phone is provided with a primary modem and a secondary modem, a good antenna is allocated to the primary modem, and a poor antenna is allocated to the secondary modem. It is assumed that a paging cycle of the primary modem ranges from a first second to a fifth second, and a paging cycle of the secondary modem ranges from a sixth second to a tenth second. From the first second to the fifth second, the primary modem can receive, by using the good antenna, a paging message sent by a base station, thereby maintaining a network connection and maintaining normal communication such as answering a call or receiving a short messaging service message. From the sixth second to the tenth second, the secondary modem cannot receive, by using the poor antenna, a paging message sent by the base station. Consequently, a network connection is disconnected, and normal communication cannot be maintained. For example, a call cannot be answered or a short messaging service message cannot be received.

When the paging cycles of the modems overlap, because a good antenna is usually fixedly allocated to a particular modem, similarly, remaining modems cannot receive a paging signal or receive a paging signal with an excessively low signal quality value within paging cycles of the modems because the modems cannot use the good antenna, and consequently, these modems are disconnected from a network.

Therefore, it is necessary to provide a method that enables a good antenna to be allocated to all modems within paging cycles of the modems, so that the modems do not miss a paging message or a problem of network disconnection resulting from an excessively weak paging message is avoided. Certainly, even when the paging cycles of the modems collide, a good antenna manner may be allocated to all the modems.

Embodiment 1

Figure 1:
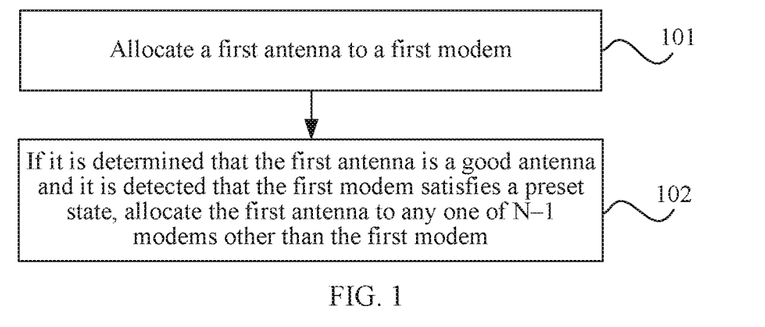
FIG. 1 is a schematic flowchart of an antenna allocation method according to Embodiment 1 of the disclosure.

An embodiment of the disclosure provides an antenna allocation method, applied to a terminal provided with N modems. As shown in FIG. 1, the method includes the following steps.

Step 101: Allocate a first antenna to a first modem. The modem obtains information in an SIM card disposed in the terminal, so that a control module of the terminal performs allocation. The control module of the terminal may be a common control module of the terminal and is responsible for allocating an antenna to the modem. The control module of the terminal switches the first antenna to the first modem according to an antenna allocation algorithm, and the control module instructs the first modem to receive a paging signal by using the first antenna. The control module is a common control module of the N modems, and the control module allocates an antenna to each modem.

Step 102: If it is determined that the first antenna is a good antenna, allocate the first antenna to any one of N−1 modems other than the first modem when it is determined that the first modem satisfies a preset state.

The good antenna means that a particular modem can receive a paging signal or receives a paging signal with a relatively high signal quality value by using the antenna within a paging cycle of the modem. The first modem is any one of the N modems of the terminal.

Specifically, the terminal receives a paging signal corresponding to the first modem by using the first antenna. Further, when determining that a signal quality value of the paging signal received by using the first antenna is greater than a preset threshold, the terminal determines that the first antenna is a good antenna. Alternatively, when determining that a signal corresponding to the first modem is received by using the first antenna, the terminal determines that the first antenna is a good antenna.

During specific implementation, when determining whether the first modem satisfies the preset state, the terminal needs to distinguish paging cycles of the modems to determine whether the paging cycles of the modems collide. This specifically includes the following.

1. When the paging cycles of the modems collide, determining that the first modem satisfies a preset state specifically includes determining that the first modem already continuously receives Y paging signals, where Y is a preset value; or determining that signal quality values of Y paging signals continuously received by the first modem are all greater than the preset threshold.

During specific implementation, when the paging cycles of the modems collide, a good antenna is allocated to the modems in turn. The modems receive respective paging signals (or detect signal quality values of received paging signals), and report results to the control module of the terminal to complete antenna allocation according to the results reported by the modems.

For example, if a mobile phone is provided with a primary modem and a secondary modem, the first antenna (that is, a good antenna) may be first allocated to the primary modem. When determining that the primary modem already continuously receives three paging signals or signal quality values of three continuously received paging signals are all greater than the preset threshold, the control module of the mobile phone may switch the first antenna to the secondary modem. The secondary modem receives a paging signal by using the first antenna. Certainly, when determining that the secondary modem already continuously receives three paging signals or signal quality values of three continuously received paging signals are all greater than the preset threshold, the control module of the mobile phone may switch the first antenna to the primary modem. In this way, when the paging cycles of the modems collide, the modems may use a good antenna in turn, thereby ensuring that each modem maintains a network connection and normal communication.

2. When the paging cycles of the modems do not collide, determining that the first modem satisfies a preset state specifically includes determining that a paging cycle of the first modem already ends.

During specific implementation, when the paging cycles of the modems do not collide, a good antenna is allocated to a modem within a paging cycle of the modem. For example, if the mobile phone is provided with a primary modem and a secondary modem, the first antenna (that is, a good antenna) may be first allocated to the primary modem, and when determining that a paging cycle of the primary modem ends, the control module of the mobile phone may switch the first antenna to the secondary modem. The secondary modem receives a paging signal by using the first antenna. When determining that the paging cycle of the secondary modem ends, the control module of the mobile phone may switch the first antenna to the primary modem. In this way, when the paging cycles of the modems do not collide, the modems may receive paging signals by using a good antenna within the paging cycles of the modems, thereby ensuring that each modem maintains a network connection and normal communication. When N is greater than or equal to 3, it may still be ensured that each modem uses a good antenna.

Specifically, the first antenna is allocated to a first modem. If it is determined that the first modem satisfies a preset state, the first antenna is allocated to any one of N−1 modems other than the first modem. For example, the first antenna is allocated to a second one of the N−1 modems other than the first modem. In this case, the second modem is equivalent to the first modem in 101 and 102 in this embodiment of the disclosure. Therefore, when it is determined that the second modem satisfies the preset state, the first antenna is allocated to any one of N−1 modems other than the second modem. The "N−1 modems other than the second modem" are divided into two parts. The first modem, and N−2 modems other than the first modem and the second modem. Herein, the first antenna may be allocated to the first modem, or the first antenna may be allocated to any one of N−2 modems other than the first modem and second modem. This is not limited herein. Allocating the first antenna to any one of N−2 modems other than the first modem and second modem enables more modems to receive paging signals by using a good antenna, thereby ensuring normal communication of more modems. That is, the modem selected after performing steps 101 and 102 each time is a modem not selected when previously performing steps 101 and 102 until each modem receives a paging signal by using a good antenna.

In addition, if the terminal determines that the first antenna is a poor antenna, a second antenna is allocated to the first modem, and a paging signal corresponding to the first modem is received by using the second antenna.

In this way, the first antenna in step 102 may be replaced with the second antenna to perform step 102. That is, the second antenna is allocated to the first modem. If it is determined that the second antenna is a good antenna, when it is determined that the first modem satisfies the preset state, the second antenna is allocated to any one of the N−1 modems other than the first modem.

Further, when determining that a signal quality value of the paging signal that is received by using the second antenna is greater than the preset threshold, the terminal determines that the second antenna is a good antenna.

Alternatively, when not receiving a signal corresponding to the first modem by using the second antenna, the terminal may determine that the second antenna is a good antenna.

It should be noted that the method provided in the disclosure is applicable to modems of a same standard and is also applicable to modems of different standards. If standards of modems are different, the modems have different definitions of a good antenna and a poor antenna, and the foregoing contention phenomenon does not occur between the modems. The method provided in this embodiment of the disclosure is applicable to a scenario in which modems of different standards have a same definition of a good antenna and a poor antenna, and the modems contend for use of a good antenna. Certainly, the method is also applicable to a scenario in which modems of a same standard contend for use of a good antenna.

The disclosure provides an antenna allocation method. A first antenna is allocated to a first modem. If it is determined that the first modem satisfies a preset state, the first antenna is allocated to any one of N−1 modems other than the first modem. After the first antenna is allocated to any modem other than the first modem, after the any modem satisfies the preset state, the first antenna may be allocated to any one of remaining modems. In this way, it can be ensured that each modem receives a signal by using a good antenna in turn. Compared with the other approaches in which some modems are disconnected from a network because it cannot be ensured that each modem receives a signal by using a good antenna, the method provided in the disclosure may avoid a problem that a modem is disconnected from a network because the modem cannot use a good antenna.

Embodiment 2

Figure 2:
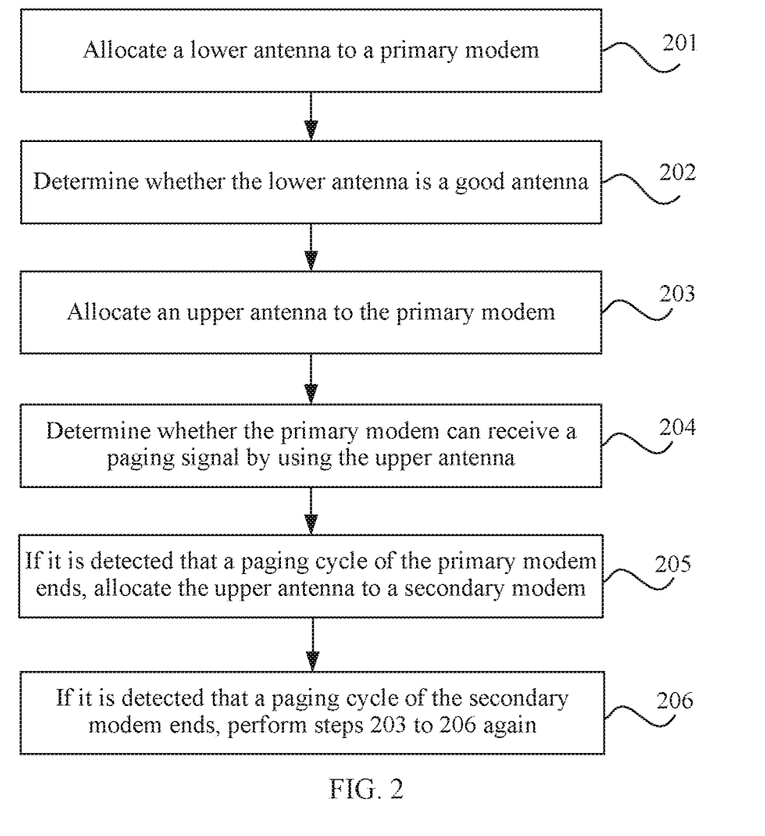
FIG. 2 is a schematic flowchart of an antenna allocation method according to Embodiment 2 of the disclosure.

In this embodiment, a terminal is provided with a primary modem and a secondary modem, and an upper antenna and a lower antenna. In addition, paging cycles of the primary modem and the secondary modem do not collide, or the primary modem and the secondary modem do not contend for use of a particular antenna. This embodiment of the disclosure provides an antenna allocation method. As shown in FIG. 2, the method is performed by the terminal. The method includes the following steps.

Step 201: Allocate a lower antenna to the primary modem.

Step 202: Determine whether the lower antenna is a good antenna.

Specifically, whether the primary modem can receive a paging signal by using the lower antenna is determined, or whether a signal quality value of a paging signal that is received by the primary modem by using the lower antenna is greater than a preset threshold may be determined.

Herein, assuming that the primary modem cannot receive a paging signal by using the lower antenna, or a signal quality value of a paging signal received by using the lower antenna is less than the preset threshold, it is determined that the lower antenna is a poor antenna, so as to allocate the upper antenna to the primary modem and the secondary modem in turn.

Step 203: Allocate an upper antenna to the primary modem.

Step 204: Determine whether the primary modem can receive a paging signal by using the upper antenna.

Specifically, similar to step 202, whether the primary modem can receive a paging signal by using the upper antenna is determined, or whether a signal quality value of a paging signal that is received by the primary modem by using the upper antenna is greater than the preset threshold is determined.

Herein, assuming that the primary modem can receive a paging signal by using the upper antenna, or a signal quality value of a paging signal received by using the upper antenna is greater than the preset threshold, it is determined that the upper antenna is a good antenna, so as to allocate the upper antenna to the primary modem and the secondary modem in turn. If it is determined that the lower antenna is a poor antenna herein, steps 201 and 202 are performed to determine whether the upper antenna is a good antenna or a poor antenna.

Then, the primary modem may receive the paging signal by using the upper antenna (good antenna) within a paging cycle of the primary modem, thereby ensuring normal communication.

Step 205: If it is determined/detected that a paging cycle of the primary modem ends, allocate the upper antenna to a secondary modem. Then, the secondary modem may receive the paging signal by using the upper antenna (good antenna) within a paging cycle of the secondary modem, thereby ensuring normal communication.

Step 206: If it is determined/detected that a paging cycle of the secondary modem ends, perform steps 203 to 206 again.

In this way, the primary modem and the secondary modem may both receive a paging signal by using a good antenna within the paging cycles of the primary modem and the secondary modem, thereby ensuring normal communication of the primary modem and the secondary modem.

It should be noted that if it is determined, in step 202, that the lower antenna is a good antenna, step 204 is deleted, and the upper antenna in steps 203, 205, and 206 is replaced with the lower antenna. Optionally, the upper antenna may be allocated to the primary modem before step 203, to determine that the upper antenna is a poor antenna.

The disclosure provides an antenna allocation method. A first antenna is allocated to a first modem. If it is determined that the first modem satisfies a preset state, the first antenna is allocated to any one of N−1 modems other than the first modem. After the first antenna is allocated to any modem other than the first modem, after the any modem satisfies the preset state, the first antenna may be allocated to any one of remaining modems. In this way, it can be ensured that each modem receives a signal by using a good antenna in turn. Compared with the prior art in which some modems are disconnected from a network because it cannot be ensured that each modem receives a signal by using a good antenna, the method provided in the disclosure may avoid a problem that a modem is disconnected from a network because the modem cannot use a good antenna.

Embodiment 3

Figure 3:
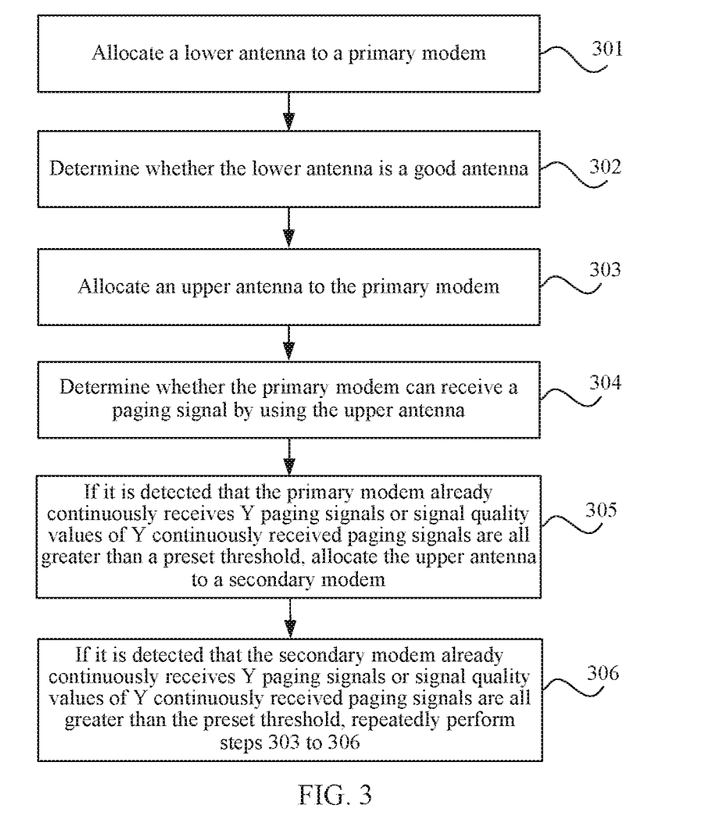
FIG. 3 is a schematic flowchart of an antenna allocation method according to Embodiment 3 of the disclosure.

In this embodiment, the terminal is provided with a primary modem and a secondary modem, and an upper antenna and a lower antenna. In addition, paging cycles of the primary modem and the secondary modem collide, or the primary modem and the secondary modem contend for use of a particular antenna. This embodiment of the disclosure provides an antenna allocation method. As shown in FIG. 3, the method is performed by the terminal. The method includes the following steps.

Step 301: Allocate a lower antenna to the primary modem.

Step 302: Determine whether the lower antenna is a good antenna.

Specifically, whether the primary modem can receive a paging signal by using the lower antenna is determined, or whether a signal quality value of a paging signal that is received by the primary modem by using the lower antenna is greater than a preset threshold may be determined.

Herein, assuming that the primary modem cannot receive a paging signal by using the lower antenna, or a signal quality value of a paging signal received by using the lower antenna is less than the preset threshold, it is determined that the lower antenna is a poor antenna, so as to allocate the lower antenna to the primary modem and the secondary modem in turn.

Step 303: Allocate an upper antenna to the primary modem.

Step 304: Determine whether the primary modem can receive a paging signal by using the upper antenna. Specifically, similar to step 302, whether the primary modem can receive a paging signal by using the upper antenna is determined, or whether a signal quality value of a paging signal that is received by the primary modem by using the upper antenna is greater than the preset threshold is determined.

Herein, assuming that the primary modem can receive a paging signal by using the upper antenna, or a signal quality value of a paging signal received by using the upper antenna is greater than the preset threshold, it is determined that the upper antenna is a good antenna, so as to allocate the upper antenna to the primary modem and the secondary modem in turn. If it is determined that the lower antenna is a poor antenna herein, steps 301 and 302 are performed to determine whether the upper antenna is a good antenna or a poor antenna.

Then, the primary modem may receive the paging signal by using the upper antenna (good antenna) within a paging cycle of the primary modem, thereby ensuring normal communication.

Step 305: If it is determined/detected that the primary modem already continuously receives Y paging signals or signal quality values of Y continuously received paging signals are all greater than a preset threshold, allocate the upper antenna to the secondary modem. Then, the secondary modem may receive the paging signal by using the upper antenna (good antenna), thereby ensuring normal communication.

Step 306: If it is determined/detected that the secondary modem already continuously receives Y paging signals or signal quality values of Y continuously received paging signals are all greater than the preset threshold, repeatedly perform steps 303 to 306.

In this way, the primary modem and the secondary modem may both receive a paging signal by using a good antenna even if paging cycles of the primary modem and the secondary modem collide, thereby ensuring normal communication of the primary modem and the secondary modem.

It should be noted that if it is determined, in step 302, that the lower antenna is a good antenna, step 304 is deleted, and the upper antenna in steps 303, 305, and 306 is replaced with the lower antenna. Optionally, the upper antenna may be allocated to the primary modem before step 303, to determine that the upper antenna is a poor antenna.

The disclosure provides an antenna allocation method. A first antenna is allocated to a first modem. If it is determined that the first modem satisfies a preset state, the first antenna is allocated to any one of N−1 modems other than the first modem. After the first antenna is allocated to any modem other than the first modem, after the any modem satisfies the preset state, the first antenna may be allocated to any one of remaining modems. In this way, it can be ensured that each modem receives a signal by using a good antenna in turn. Compared with the prior art in which some modems are disconnected from a network because it cannot be ensured that each modem receives a signal by using a good antenna, the method provided in the disclosure may avoid a problem that a modem is disconnected from a network because the modem cannot use a good antenna.

Embodiment 4

Figure 4:
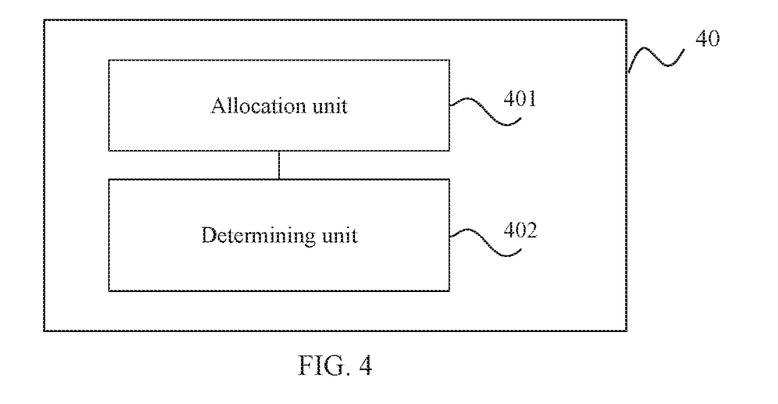
FIG. 4 is a structural block diagram of a terminal according to Embodiment 4 of the disclosure.

The disclosure provides a terminal 40. The terminal 40 is provided with N subscriber identity modems, N being an integer greater than 1. As shown in FIG. 4, the terminal 40 includes an allocation unit 401 and a determining unit 402. The allocation unit 401 is configured to allocate a first antenna to a first modem. The determining unit 402 is configured to determine whether an antenna is a good antenna or a poor antenna.

The allocation unit 401 is further configured to, if the determining unit 402 determines that the first antenna is a good antenna, allocate the first antenna to any one of N−1 modems other than the first modem when the determining unit determines that the first modem satisfies a preset state.

The determining unit 402 is specifically configured to determine that the first modem satisfies the preset state when it is determined that the first modem already continuously receives Y paging signals, where Y is a preset value; or determine that the first modem satisfies the preset state when it is determined that signal quality values of Y paging signals continuously received by the first modem are all greater than a preset threshold. The determining unit 402 is specifically configured to determine that the first modem satisfies the preset state when it is determined that a paging cycle of the first modem already ends.

The allocation unit 401 is further configured to allocate a second antenna to the first modem if the determining unit 402 determines that the first antenna is a poor antenna.

The terminal further includes a receiving unit, where the receiving unit is configured to receive a paging signal corresponding to the first modem by using the first antenna.

The determining unit 402 is specifically configured to determine that the second antenna is a poor antenna when it is determined that a signal quality value of a paging signal that is received by using the second antenna is less than the preset threshold, or determine that the first antenna is a poor antenna when it is determined that a signal corresponding to the first modem is not received by using the first antenna. The determining unit 401 is specifically configured to determine that the first antenna is a good antenna when it is determined that the paging signal corresponding to the first modem is received by using the first antenna; and determine that the first antenna is a good antenna when it is determined that the signal quality value of the paging signal that is received by using the first antenna is greater than the preset threshold.

The disclosure provides a terminal. A first antenna is allocated to a first modem. If it is determined that the first modem satisfies a preset state, the first antenna is allocated to any one of N−1 modems other than the first modem. After the first antenna is allocated to any modem other than the first modem, after the any modem satisfies the preset state, the first antenna may be allocated to any one of remaining modems. In this way, it can be ensured that modems receive a signal by using a good antenna in turn. Compared with the prior art in which some modems are disconnected from a network because it cannot be ensured that each modem receives a signal by using a good antenna, the terminal provided in the disclosure may avoid a problem that a modem is disconnected from a network because the modem cannot use a good antenna.

Embodiment 5

Figure 5:
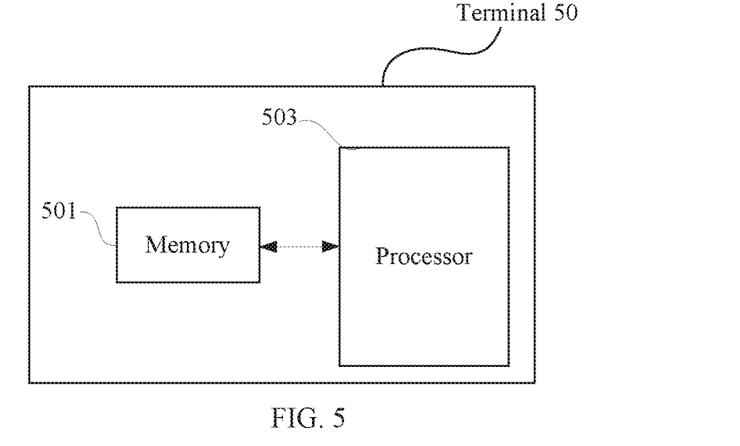
FIG. 5 is a structural block diagram of a terminal according to Embodiment 5 of the disclosure.

An embodiment of the disclosure provides a terminal 50. The terminal 50 is provided with N subscriber identity modems, N being an integer greater than 1. The terminal may be a mobile phone. As shown in FIG. 5, the terminal 50 includes a memory 501 and a processor 503. A person skilled in the art may understand that the structure of the mobile phone shown in FIG. 5 does not constitute a limitation to the mobile phone, and the mobile phone may include more components or fewer components than those shown in the figure, or some components may be combined, or a different component deployment may be used.

The following specifically describes components of the terminal 50 with reference to FIG. 5.

The memory 501 may be configured to store a software program and a module, and the processor 503 runs the software program and the module that are stored in the memory 501, so as to perform various functional applications of the terminal 50 and data processing. The memory 501 may mainly include a program storage area and a data storage area. The program storage area may store an operating system, an application program required by at least one function (such as a sound playing function and an image display function), and the like. The data storage area may store data (such as audio data, image data, and an address book) created according to use of the terminal 50, and the like. In addition, the memory 501 may include a high speed random access memory, and may also include a non-volatile memory such as at least one magnetic disk storage device, a flash memory, or another volatile solid-state storage device.

The processor 503 is a control center of the terminal 50, and is connected to various parts of the entire mobile phone by using various interfaces and lines. By running or executing the software program and/or module stored in the memory 501, and invoking data stored in the memory 501, the processor 503 performs various functions and data processing of the terminal 50, thereby performing overall monitoring on the mobile phone. Optionally, the processor 503 may include one or more processing units. Preferably, the processor 503 may integrate an application processor and a modem processor. The application processor mainly processes an operating system, a user interface, an application program, and the like. The modem processor mainly processes wireless communication. It may be understood that the foregoing modem processor may not be integrated into the processor 503.

The processor 503 is configured to allocate a first antenna to a first modem; and determine whether an antenna is a good antenna or a poor antenna. The processor 503 is further configured to, if it is determined that the first antenna is a good antenna, allocate the first antenna to any one of N−1 modems other than the first modem when it is determined that the first modem satisfies a preset state. The processor 503 is specifically configured to determine that the first modem satisfies the preset state when it is determined that the first modem already continuously receives Y paging signals, where Y is a preset value; or determine that the first modem satisfies the preset state when it is determined that signal quality values of Y paging signals continuously received by the first modem are all greater than a preset threshold.

The processor 503 is specifically configured to determine that the first modem satisfies the preset state when it is determined that a paging cycle of the first modem already ends. The processor 503 is further configured to allocate a second antenna to the first modem if it is determined that the first antenna is a poor antenna. The processor 503 is further configured to receive a paging signal corresponding to the first modem by using the first antenna. The processor 503 is specifically configured to determine that the second antenna is a poor antenna when it is determined that a signal quality value of a paging signal that is received by using the second antenna is less than the preset threshold, or determine that the first antenna is a poor antenna when it is determined that a signal corresponding to the first modem is not received by using the first antenna. The processor 503 is specifically configured to determine that the first antenna is a good antenna when it is determined that the paging signal corresponding to the first modem is received by using the first antenna; and determine that the first antenna is a good antenna when it is determined that the signal quality value of the paging signal that is received by using the first antenna is greater than the preset threshold.

The disclosure provides a terminal. A first antenna is allocated to a first modem. If it is determined that the first modem satisfies a preset state, the first antenna is allocated to any one of N−1 modems other than the first modem. After the first antenna is allocated to any modem other than the first modem, after the any modem satisfies the preset state, the first antenna may be allocated to any one of remaining modems. In this way, it can be ensured that modems receive a signal by using a good antenna in turn. Compared with the prior art in which some modems are disconnected from a network because it cannot be ensured that each modem receives a signal by using a good antenna, the terminal provided in the disclosure may avoid a problem that a modem is disconnected from a network because the modem cannot use a good antenna.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. An antenna allocation method for a terminal, comprising:
    allocating a first antenna to a first modem of a plurality of modems; and
    allocating the first antenna to a second modem of the plurality of modems when the first modem satisfies a preset state and the first antenna is a good antenna, the good antenna being an antenna coupled to a modem that receives a paging signal, and the preset state being when a signal quality value of each paging signal of a number of continuously received paging signals at the first modem is greater than a preset threshold.

2. The method according to claim 1, wherein the first modem satisfies the preset state when a paging cycle of the first modem has ended.

3. The method according to claim 1, further comprising allocating a second antenna to the first modem when the first antenna is a poor antenna.

4. The method according to claim 3, wherein the first antenna is the poor antenna, and the method further comprising:
    receiving, at the first antenna, a paging signal corresponding to the first modem using the first antenna; and
    determining that a signal quality value of the paging signal received using the first antenna is less than the preset threshold.

5. The method according to claim 3, wherein the first antenna is the poor antenna when a signal corresponding to the first modem is not received at the first antenna.

6. The method according to claim 1, wherein the first antenna is a good antenna, and the method further comprising:
    receiving a paging signal corresponding to the first modem using the first antenna; and
    determining that a signal quality value of the paging signal at the first antenna is greater than the preset threshold.

7. The method according to claim 6, wherein the first antenna is a good antenna when the paging signal corresponding to the first modem is received at the first antenna.

8. A terminal, comprising:
    a plurality of modems;
    a processor in communication with at least one modem of the plurality of modems and configured to:
        allocate a first antenna to a first modem of the plurality of modems;
        determine whether the first antenna is a good antenna, the good antenna being an antenna coupled to a modem that receives a paging signal; and
        allocate the first antenna to a second modem of the plurality of modems when the first antenna is the good antenna and the first modem satisfies a preset state, the preset state being when a signal quality value of each paging signal of a number of continuously received paging signals at the first modem is greater than a preset threshold.

9. The terminal according to claim 8, wherein the first modem satisfies the preset state when a paging cycle of the first modem has ended.

10. The terminal according to claim 8, wherein the processor is further configured to allocate a second antenna to the first modem when the first antenna is a poor antenna.

11. The terminal according to claim 10, wherein the processor is further configured to:
    receive a paging signal corresponding to the first modem using the first antenna; and
    determine that the second antenna is the poor antenna when a signal quality value of a paging signal received by the first antenna is less than the preset threshold.

12. The terminal according to claim 10, wherein the first antenna is the poor antenna when a signal corresponding to the first modem is not received by the first antenna.

13. The terminal according to claim 8, wherein the first antenna is a good antenna, a paging signal corresponding to the first modem is received by the first antenna, and a signal quality value of the paging signal received by the first antenna being greater than the preset threshold.

\* \* \* \* \*